United States Patent [19]

Harrington et al.

[11] Patent Number: 5,086,650
[45] Date of Patent: Feb. 11, 1992

[54] LOW NOISE FLUID FLOW SENSOR MOUNTING

[75] Inventors: Charles R. Harrington, Troy; Stephen P. Sanders, Flint, both of Mich.

[73] Assignee: General Motors Corporation, Detroit, Mich.

[21] Appl. No.: 637,724

[22] Filed: Jan. 7, 1991

[51] Int. Cl.⁵ .............................. G01F 1/68
[52] U.S. Cl. ........................... 73/204.21; 73/204.26
[58] Field of Search .......... 73/204.21, 204.22, 204.23, 73/204.25, 204.26

[56] References Cited

U.S. PATENT DOCUMENTS

| | | | |
|---|---|---|---|
| 4,587,842 | 5/1986 | Handtmann | 73/204.14 |
| 4,955,230 | 9/1986 | Hall | 73/204.26 |
| 4,981,035 | 1/1991 | Hall | 73/204.21 |
| 5,024,083 | 6/1991 | Inada et al. | 73/204.26 |

FOREIGN PATENT DOCUMENTS

| | | | |
|---|---|---|---|
| 0208412 | 12/1982 | Japan | 73/204.26 |
| 0206715 | 11/1984 | Japan | 73/204.21 |

OTHER PUBLICATIONS

L. L. Kazmerski, "Electrical and Optical Properties of Polycrystalline Semiconductor Thin Films", published in Polycrystalline and Amorphous Thin Films and Devices, L. L. Dazmerski, Editor, Academic Press, New York, 1980, p. 104.

Primary Examiner—Herbert Goldstein
Attorney, Agent, or Firm—Tim G. Jaeger

[57] ABSTRACT

An airflow sensor in a flat chip configuration having sensing elements on only one side is subject to causing turbulence in the airflow which has a deleterious effect on the flow signal. The turbulence is diminished or prevented and sensitivity is enhanced by tilting the plane of the sensor a few degrees to the flow direction. Flow in both directions through a passage is measured by bending the passage at the sensor location so that the flow in either direction is inclined to the surface carrying the sensing elements. Flow in both directions through a straight passage is measured by providing the sensor with sensing elements on both sides and mounting the sensor at a tilt so that flow in both directions is inclined to a surface of the sensor.

13 Claims, 2 Drawing Sheets 5,086,650

LOW NOISE FLUID FLOW SENSOR MOUNTING

FIELD OF THE INVENTION

This invention relates to a mounting configuration for a fluid flow sensor and particularly for a high signal to noise ratio.

BACKGROUND OF THE INVENTION

In mass air flow sensors used in the induction passages of automotive vehicles it is desirable to obtain a signal which can be used for real time control of fuel injection. Such a signal must have a high signal to noise ratio so that the time delay associated with filtering can be nearly eliminated.

Important classes of MAF sensors comprise a small chip or substrate of semiconductor or insulator material mounted in the air stream and having surface mounted or deposited elements for sensing the air flow. These may include constant temperature anemometry or time of flight measurement. The latter class is exemplified by the U.S. Pat. No. 4,576,050 to Lambert entitled "Thermal Diffusion Fluid Flow Sensor", which is incorporated herein by reference. That patent describes a solid state sensor having a low diffusivity layer carrying a resistive heater strip and a thermoelectric detector spaced from the heater strip to detect thermal waves emitted from the heater strip. The time of transport of the thermal wave from emitter to detector is a function of the fluid flow across the substrate. U.S. Pat. No. 4,782,708 to Harrington et al entitled "Thermocouple Sensors" is related to the Lambert patent and reveals specific thermocouple materials for use as the detector.

Sensors having such extended surfaces or which are mounted on extended surfaces are subject to noise which arises from turbulence or recirculation of air, or are subject to a boundary layer of air which has a velocity lower than the average airflow in the induction passage. Either effect makes the sensor unacceptable for real time MAF signal processing. Thus the importance of correct disposition of the sensor in the passage is important.

U.S. Pat. No. 3,374,673 to Trageser entitled "Mass Flowmeter Structure" recognizes the likelihood of turbulence occurring in the flow passage and proposes to reduce such instabilities at the flow sensor by placing a foraminous structure upstream of the sensor and by incorporating a venturi restriction in the passage, the sensor being placed at the throat of the venturi as the most stable location. Both of these measures are objectionable since they introduce flow restrictions into the passage. Moreover, this patent mainly deals with turbulence and the like created upstream of the sensor and does not advise how to manage the airflow to avoid turbulence created by the sensor itself.

U.S. Pat. No. 4,317,385 to Lauterbach also imposes restrictions in the flow passage in an attempt to create a region of stabilized flow for flow measurement. A nozzle-like restriction is formed in the passage and the sensor element is mounted on the wall of the restriction or on a wedge shaped or lenticular element suspended on the center axis of the restriction, upstream of the throat of the restriction. Again, it is desirable to avoid such a restriction in the air flow passage.

Generally, the flow sensors are unidirectional; that is, they measure the airflow in only one direction or they measure the airflow in either direction without discrimination so that in the case of pulsating airflow a reverse airflow is added to forward airflow to give a false measure. This is usually the case with constant temperature anemometers: the cooling effect of the air on the airflow sensor is independent of the flow direction so that reverse flow is added to forward flow. In some cases the flow passage geometry is designed to prevent reverse flow from affecting the airflow sensor, so that the reverse flow is ignored in the flow measurements. Reverse flow does occur in the induction passages of internal combustion engines due to pulsation caused by the engine valve action and is especially noticeable in engines with a small number of cylinders. To get an accurate measure of the net airflow to such an engine it is necessary to separately measure the forward and reverse airflows and calculate the difference.

SUMMARY OF THE INVENTION

It is therefore an object of the invention to provide a mounting arrangement for a flow sensor chip which yields a low noise signal useful for real time calculation of airflow. It is another object to provide such a mounting arrangement for measurement of airflow in both directions to enable determination of net airflow.

The invention is carried out by apparatus for the measurement of fluid flow comprising: a flow passage having walls for guiding fluid in a flow path, a flow sensing chip having a thin flat substrate and sensing elements mounted on at least one side of the substrate, mounting means for holding a flow sensing chip in the passage and spaced from the passage walls, the substrate of the flow sensing chip having a leading edge extending upstream of the mounting means, and the chip being mounted at a tilt to the flow path with the sensing elements inclined toward the fluid flow, the chip being tilted sufficiently to be substantially free of turbulence in the region of the sensing elements.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
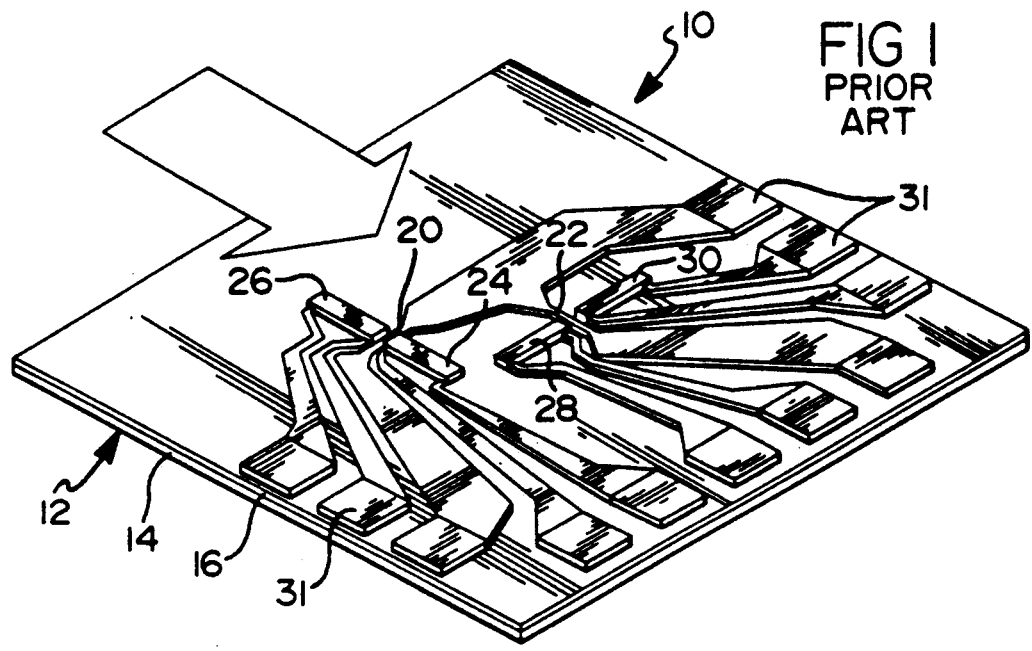
FIG. 1 is perspective view of a prior art flow sensor used in apparatus according to the invention.

The following description is directed to an air flow sensing apparatus designed for use with a time of flight type of sensor such as described in the above-mentioned Lambert U.S. Pat. No. 4,576,050. Such sensors or "chips" have a thin flat substrate which carries sensing elements on one surface for sensing the mass air flow at or very near the surface. Other sensors having a different sensing mechanism but similar geometry, such as chips employing a constant temperature heater, may be used as well. In each case the presence of a sensor in the air flow can generate turbulence which causes noise in the sensor output signal and prevents obtaining a signal suitable for real time control. The turbulence is minimized by tilting the sensor such that the surface carrying sensor elements is inclined toward the flow, i.e., the angle between that surface and the flow direction is less than 180° so that the fluid impinges on the surface. The flow direction is shown by arrows in the drawings. It should be recognized that the invention is applicable to fluids other than air and can extend to liquid flow measurement.

A preferred sensing chip or sensor 10 is shown in FIG. 1. It has a two layer substrate 12 comprising a layer of silicon 14 (or other thermal conductor) covered with an isolation layer 16 which has low thermal diffusivity relative to air and high thermal conductivity relative to air. A suitable isolation layer 16 comprises polyimide or Mylar (TM). The substrate may be, for example, 1 cm square and 0.4 mm thick. The exposed surface of the isolation layer carries the sensing elements which comprises two resistive heaters 20, 22 and four detectors 24-30, two on each side of each heater, all connected to pads 31 at the periphery of the chip. Each detector comprises a thermocouple having one junction near a heater and the other junction remote from the heater. The primary heater 20 extends perpendicular to the direction of airflow (shown by the arrow) and detectors 24 and 26 are just downstream and upstream, respectively, from the heater 20 and are oriented parallel to the airflow direction. The reference heater 22 and its associated detectors 28 and 30 are relatively arranged like the elements 20, 24 and 26, but are turned 90° with the heater 22 parallel to the airflow direction.

In operation, the heaters 20, 22 are repetitively and synchronously pulsed with current to give off thermal waves which travel to the adjacent thermocouple junctions to thus create output signals. In the case of the primary heater, the thermal wave is carried downstream by the airflow at a rate determined by the flow velocity so that the propagation time or the phase difference of the heater current and the output signal from detector 24 is a measure of the air flow. Air temperature and pressure also influence the propagation time and accordingly a reference measurement representing zero flow rate is made by the heater 22 and its detectors 28, 30. A comparison of the reference output signal and the primary output signal yield a value which represents mass air flow.

Figure 2:
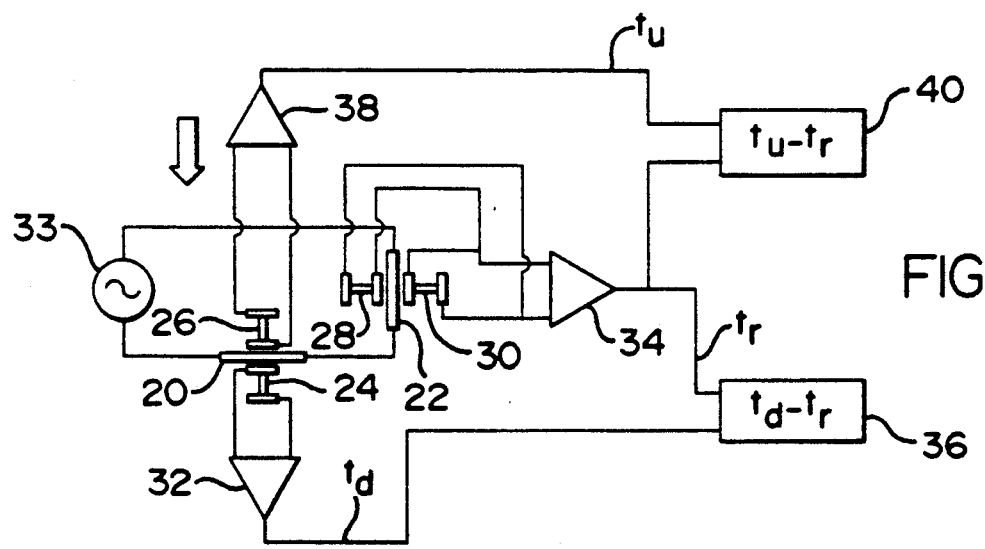
FIG. 2 is a schematic diagram of a circuit used in conjunction with the sensor of FIG. 1.

Circuitry to carry out the MAF measurement is shown in FIG. 2. An oscillator 33 produces a current which flows serially through the two heaters 20, 22 to generate the thermal waves. The two junctions of the detector 24 are input to a first differential amplifier 32 to produce a first signal $t_d$ representing the downstream transit time and the detector junctions of detectors 28 and 30 are summed and compared by a second differential amplifier 34 to yield a reference signal $t_r$ which is the reference transit time. These values are compared in a first timer 36 to generate a value $t_d - t_r$ which is the phase shift due to downstream MAF. In the same way, a third amplifier 38 is coupled to the junctions of upstream detector 26 to produce a signal $t_u$ which is compared with the reference signal in the timer circuit 40 to yield the phase shift due to reverse airflow. That is, in the event the direction of airflow reverses from the arrow direction, that flow is measured at timer 40. In an alternative sensor configuration useful for low flow, the value $t_d - t_u$ can be used for the airflow measure; in that case, the heater 22 and detectors 28 and 30 are not needed.

The quality of the output signals developed in the timers 36, 40 depends on how well the output signals represent the air flow through the air passage being monitored. For each value of MAF in the passage, there must be one consistent and unique output signal. In addition, the sensitivity of the system at low values of MAF must be great enough to produce a high signal to noise ratio. Turbulence at the surface of the sensor chip produces such a variability of signals that the airflow information is recovered only by excessive filtering to obtain an average flow. However, the filtering delay makes the signal useless for real time calculation of fuel injection requirements. Thus measures need to be taken to avoid the turbulence at the detector elements.

Figure 3:
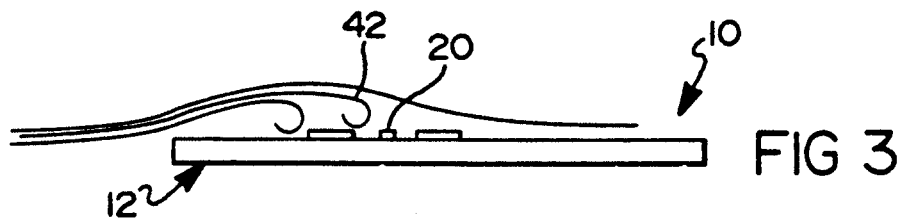
FIG. 3 is a side view of a sensor and illustrating its effect on air flow parallel to the sensor substrate.
Figure 4:
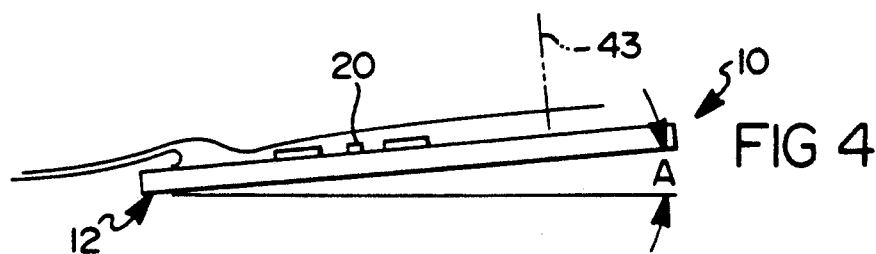
FIG. 4 is a side view of a sensor positioned according to the invention illustrating its effect on air flow inclined to the sensor substrate.
Figure 5:
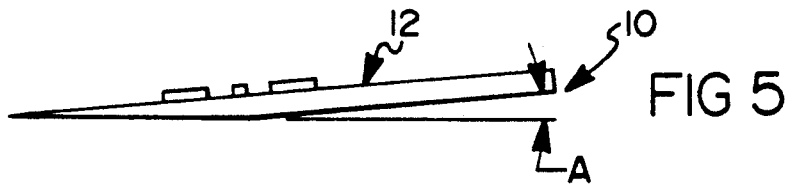
FIG. 5 is a side view of a sensor according to another embodiment of the invention.

FIG. 3 illustrates the flow of air over the flow sensing chip surface when the sensing chip 10 is mounted parallel to the airflow direction. Even though the substrate 12 is thin, its edge presents a bluff body to the air stream which flows over the leading edge and produces eddies or turbulence at the sensor elements causing perturbations in the output signal. A solution to the problem of turbulence is to tilt the sensor surface a few degrees toward the flow direction as shown in FIG. 4 to tilt the normal 43 to the surface in the upstream direction. The air stream more smoothly passes over the substrate surface and the sensor elements, causing some turbulence only adjacent the leading edge and none at the sensor elements. The resulting output signal is free of the effects of turbulence and is useful for real time fuel control computations. The tilt angle A has a minimum value of about 5°. Larger angles, say 10° or 20° produce equivalent results. When angles smaller than 5° are used, turbulence tends to occur, although the onset of turbulence occurs at smaller angles for thinner leading edges. Very thin leading edges can be obtained by beveling the substrate, preferably on the side opposite the sensor elements, as shown in FIG. 5. Sharp edges can be obtained by abrasion or by micromachining of the silicon combined with laser cutting of the polyimide. The sharp edges can lead to tilt angles less that 5°.

A second advantage results from tilting the sensor for smoother airflow over the surface. The surface air boundary layer thickness above the sensor surface affects the sensor sensitivity. A thick boundary layer causes lower velocity near the surface and thus tends to shield the sensor from the effects of the airflow to result in low sensitivity so that a low signal-to-noise ratio is produced, especially at low flow rates. This effect is evident in measurements made with the untilted sensor of FIG. 3. Tilting the sensor by about 5° or more changes the air stream to reduce the boundary layer thickness and a dramatic increase in sensitivity at low flow rates occurs. The use of sharp beveled edges further helps increase sensitivity because turbulence can be restricted to the region very close to the edge and the sensor elements can be placed even closer to the leading edge without encountering turbulence. The boundary layer decreases in thickness toward the leading edge so that placing the sensor elements nearer to the leading edge increases their sensitivity.

Figure 6:
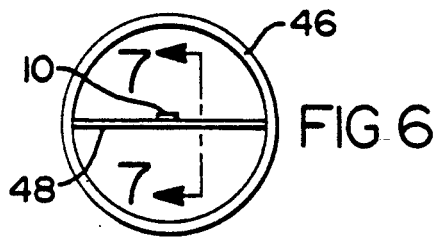
FIG. 6 is an elevation of the sensor of FIG. 4 in a duct.
Figure 7:
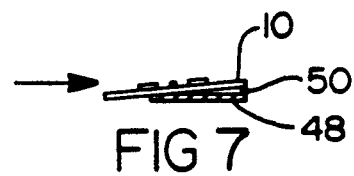
FIG. 7 is a cross section of the sensor support taken along line 7—7 of FIG. 6.

To achieve the advantages of tilting the sensor surface a few degrees toward the flow direction, there should be no structure, such as the sensor mount, upstream of the sensor which might interfere with the flow. Accordingly, the sensor 10 is mounted in such a way that the leading edge of the substrate 12 protrudes at least a small amount upstream of the mount. As shown in FIGS. 6 and 7, a duct 46 carrying the airflow to be measured has a support 48 disposed on the duct diameter and extending across the duct for attachment to opposite duct walls. The support 48 is a flat strip which is aligned in a plane parallel to the airflow. A ramped mounting pad 50 formed at the desired angle of tilt, say 7°, is secured to the center of the support 48, and the sensor 10 is mounted on the pad 50 with the leading edge of the sensor substrate extending upstream of the pad and support by a small amount, say, 1 mm. While it may be advantageous in some applications to position the sensor in the center of the duct, as shown, it is generally not necessary. The chief consideration of positioning the sensor is that it be exposed to a representative sample of the airflow. Other support styles may be used such as a pedestal.

Figure 8:
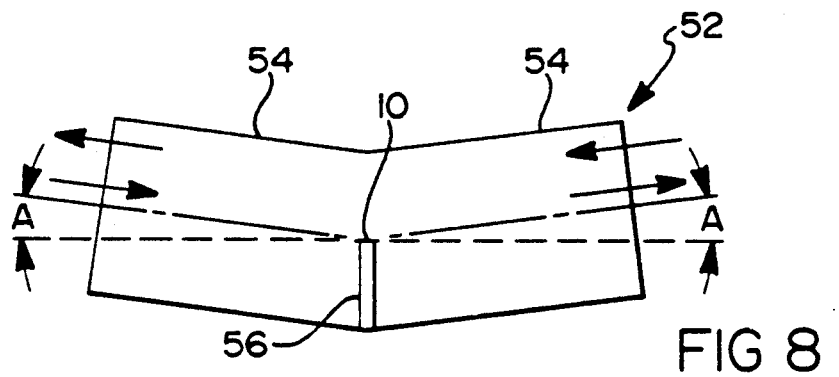
FIG. 8 is a side view of a sensor mounted in a duct for bi-directional flow measurement according to the invention.

One effect of the tilted mounting of the type shown in FIGS. 6 and 7 is that reverse flow is not properly detected by the sensor. To provide measurement in both flow directions, the flow is managed such that it approaches the sensor at a small angle to the substrate from either direction. This is accomplished by bending the flow direction through an angle and mounting the sensor at the bend. FIG. 8 shows a duct 52 comprising two straight tubular sections 54 which intersect at an angle. The angle is preferably twice the desired sensor tilt angle A relative to air flow. Typically, a bend or elbow in the duct of 15° would provide adequate tilt angle for a substrate with bluff right angle edges. The sensor 10 is mounted on a pedestal 56 at the intersection of the tubular sections 54 so that the airflow for forward or reverse direction is at an angle A to the sensor surface. Since the sensor has, in effect, two opposite leading edges, both extend beyond the mount or pedestal 56 to provide a minimum edge surface. It is desirable, especially for bi-directional measurement, to place the contact pads along the lateral edges of the substrate so that the pads and any leads attached thereto will be out of the flow path.

Figures 9, 10:
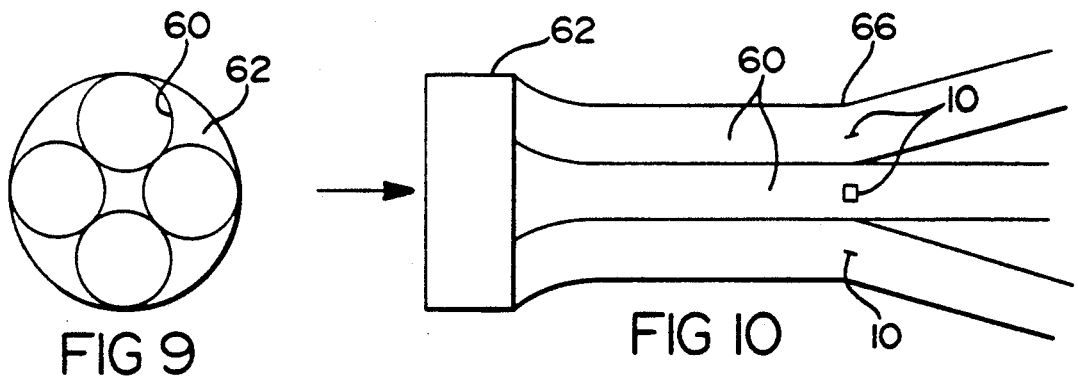
FIGS. 9 and 10 are front and side views, respectively of a duct arrangement for bi-directional flow measurement according to the invention.

A high aspect ratio of the duct (length to width ratio) helps isolate the measurement from upstream flow disturbances. In the case of bi-directional measurement, there are effectively two "upstream" regions to address, and thus a long and/or narrow duct section on each side of the sensor is desirable from the standpoint of measurement certainty. Space constraints, however, may render long ducts impractical. FIGS. 9 and 10 show an arrangement for an engine induction passage which uses narrow individual ducts 60, one for each cylinder, which connect a common inlet 62 to the engine ports. The ducts 60 each have a bend 64 and a flow sensor 10 in the bend positioned to measure flow in each direction. Thus a high aspect ratio is obtained for each duct and MAF data is obtained for each individual cylinder.

Figures 11, 12:
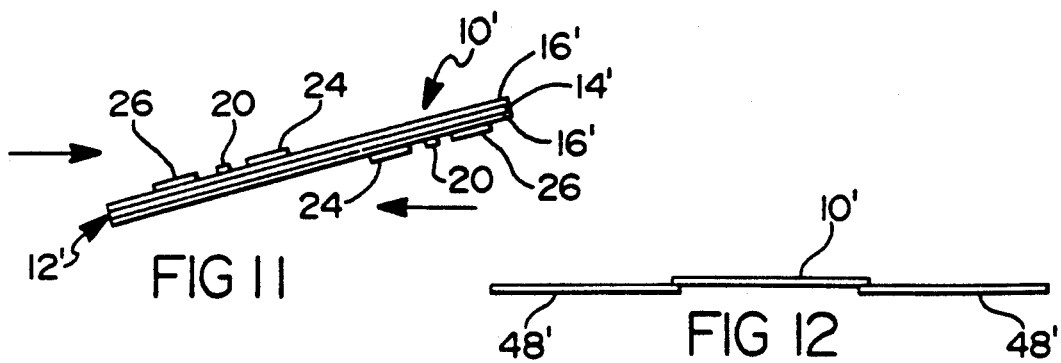
FIG. 11 is a side view of a flow sensor according to another embodiment of the invention.
FIG. 12 is a front view of the sensor of FIG. 11 showing attachment of a support for mounting the sensor.

The sensor may be designed as a two sided device rather than having only one active measurement side. Two devices like that of FIG. 1 could be bonded back-to-back. Then both sides could make MAF measurements. Alternatively, as shown in FIG. 11, the substrate 12' may have a silicon core 14' covered on each side by an isolation layer 16'. Each side of the substrate carries heaters and detectors equivalent to those shown in FIG. 1, partially shown in FIG. 11. By placing the sensor in a straight duct at a tilt angle to the flow direction, a measurement of MAF in one direction is made by one side and of MAF in the other direction by the other side. A mounting arrangement like that of FIG. 12 allows free exposure of both sides of the sensor to the airflow. Supports 48' are bonded at their inner ends to each lateral edge of the sensor 10' and are secured to the duct wall, not shown, at their outer ends. Leads, not shown, would be carried by the supports and attached to the sides of the substrate. In this manner there is no interference to the air stream by either the supports or the lead attachment.

The embodiments of the invention in which an exclusive property or privilege is claimed are defined as follows:

1. Apparatus for the measurement of fluid flow comprising:
    a flow passage having walls for guiding fluid in a flow path,
    a flow sensing chip having a thin flat substrate and sensing elements mounted on one side of the substrate,
    mounting means for holding the flow sensing chip in the passage and spaced from the passage walls, the substrate of the flow sensing chip having a leading edge extending upstream of the mounting means, and
    the flow sensing chip being mounted at a tilt to the flow path with the said one side of the substrate inclined toward the fluid flow, the chip being tilted sufficiently to be substantially free of turbulence in the region of the sensing elements.

2. The invention as defined in claim 1 wherein the chip substrate is tilted to the flow path by a minimum angle on the order of 5°.

3. The invention as defined in claim 1 wherein the said leading edge of the substrate is beveled on the other side to reduce the thickness of the leading edge and thereby minimize the fluid turbulence.

4. The invention as defined in claim 1 wherein the flow passage has a bend to change the flow path at an angle, and
    wherein the mounting means holds the flow sensing chip in the bend of the passage at an angle such that the chip is inclined toward fluid flow in either direction through the passage.

5. The invention as defined in claim 4 wherein the chip has a leading edge for each flow direction which extends outboard of the mounting means.

6. The invention as defined in claim 4 wherein the flow passage is defined by a pair of straight tubes which meet at the bend.

7. The invention as defined in claim 1 wherein the flow sensing chip further has sensing elements mounted on the other side of the substrate such that the sensing elements on the said one side of the substrate measure flow in one direction through the passage and the sensing elements of the other side measure flow in the opposite direction through the passage.

8. The invention as defined in claim 1 wherein the sensing elements mounted on the substrate comprise means for generating a thermal pulse in the fluid and means for measuring the rate of propagation of the thermal pulse.

9. The invention as defined in claim 1 wherein the sensing elements mounted on the substrate comprise a heater element for generating a thermal pulse in the fluid and at least one detector element spaced from the heater element for detecting the arrival of the thermal pulse at the at least one detector element.

10. Apparatus for the bi-directional measurement of fluid flow comprising:
   a flow passage having a bend for guiding fluid in either direction in a flow path which changes direction by a small angle,
   a flow sensing chip having a thin substrate and sensing elements mounted on one side of the substrate,
   mounting means for holding the flow sensing chip in the bend of the passage, the substrate of the flow sensing chip having leading edges extending beyond the mounting means in either direction of fluid flow,
   the chip being mounted at a tilt to the flow path with the side mounting the sensing elements inclined toward the fluid flow, the chip being tilted sufficiently to be substantially free of turbulence in the region of the sensing elements.

11. The invention as defined in claim 10 wherein the angle of tilt of the chip relative to the flow path on either side of the bend is approximately half the angle of the bend.

12. The invention as defined in claim 10 wherein the sensing elements mounted on the substrate comprise a heater element for generating a thermal pulse in the fluid and at least one detector element spaced from the heater element for detecting the arrival of the thermal pulse at the at least one detector element.

13. Apparatus for the bi-directional measurement of fluid flow in a duct comprising:
   a duct inlet,
   a plurality of passages coupled to the inlet such that each passage is smaller in cross section than the inlet,
   each flow passage having a bend for guiding fluid in either direction in a flow path which changes direction by a small angle,
   a flow sensing chip for each passage having a thin substrate and sensing elements mounted on one side of the substrate,
   mounting means for holding each flow sensing chip in the bend of its respective passage, the substrate of each flow sensing chip having leading edges extending beyond the mounting means in either direction of fluid flow,
   each chip being mounted at a tilt to the flow path with the side mounting the sensing elements inclined toward the fluid flow, the chip being tilted sufficiently to be substantially free of turbulence in the region of the sensing elements.

* * * * *